United States Patent [19]

Maioglio et al.

[11] 4,033,305
[45] July 5, 1977

[54] ELECTRONIC IGNITION SYSTEMS FOR AN INTERNAL COMBUSTION ENGINE

[75] Inventors: Mauro Maioglio, Turin; Rafael Jacoel, Milan, both of Italy

[73] Assignee: Fiat Societa per Azioni, Turin, Italy

[22] Filed: May 10, 1976

[21] Appl. No.: 684,820

[30] Foreign Application Priority Data

June 25, 1975 Italy .................................. 68628/75

[52] U.S. Cl. .................... 123/117 D; 123/146.5 A; 315/209 R; 328/1
[51] Int. Cl.² ......................................... F02P 5/04
[58] Field of Search .... 123/117 D, 117 R, 146.5 A; 328/48, 1, 5, 20; 315/209 R, 209 T, 208 M; 307/220 R, 225 R

[56] References Cited

UNITED STATES PATENTS

| | | | |
|---|---|---|---|
| 3,738,339 | 6/1973 | Huntzinger et al. | 123/117 R |
| 3,903,857 | 9/1975 | Hönig et al. | 123/117 D |
| 3,919,987 | 11/1975 | Haubner et al. | 123/117 R |
| 3,941,100 | 3/1976 | Bensch et al. | 123/139 E |
| 3,955,723 | 5/1976 | Richards | 123/117 D |

OTHER PUBLICATIONS

Frequency Doubler, Source Publication: Elektor (English), vol. 2, No. 7–8, p. 719, July–Aug. 1976, by Elektor Publishers Ltd., Canterberry, England.

*Primary Examiner*—Carroll B. Dority, Jr.
*Assistant Examiner*—Andrew Dolinar
*Attorney, Agent, or Firm*—Sughrue, Rothwell, Mion, Zinn & Macpeak

[57] ABSTRACT

A device for automatically varying the ignition spark advance angle in an electronically controlled ignition system for an internal combustion engine, in which there is a first sensor for producing a train of pulses the pulse repetition frequency of which represents the engine speed and a second sensor for producing a single pulse once each revolution of the engine when the crankshaft is at the top dead center position. A pulse counter counts the pulses from the first sensor and acts to discharge the ignition spark when it reaches a predetermined count: this counter is reset to zero each cycle by the pulse from the second sensor, there is also a timing device which sets a predetermined time interval in advance of the top dead center position and means for doubling the frequency of the pulses counted by the said counter for varying the rate at which the spark advance angle varies with change in speed of the engine, depending on whether the engine speed is above or below a threshold speed determined by the timing interval of the said timing circuit.

4 Claims, 13 Drawing Figures

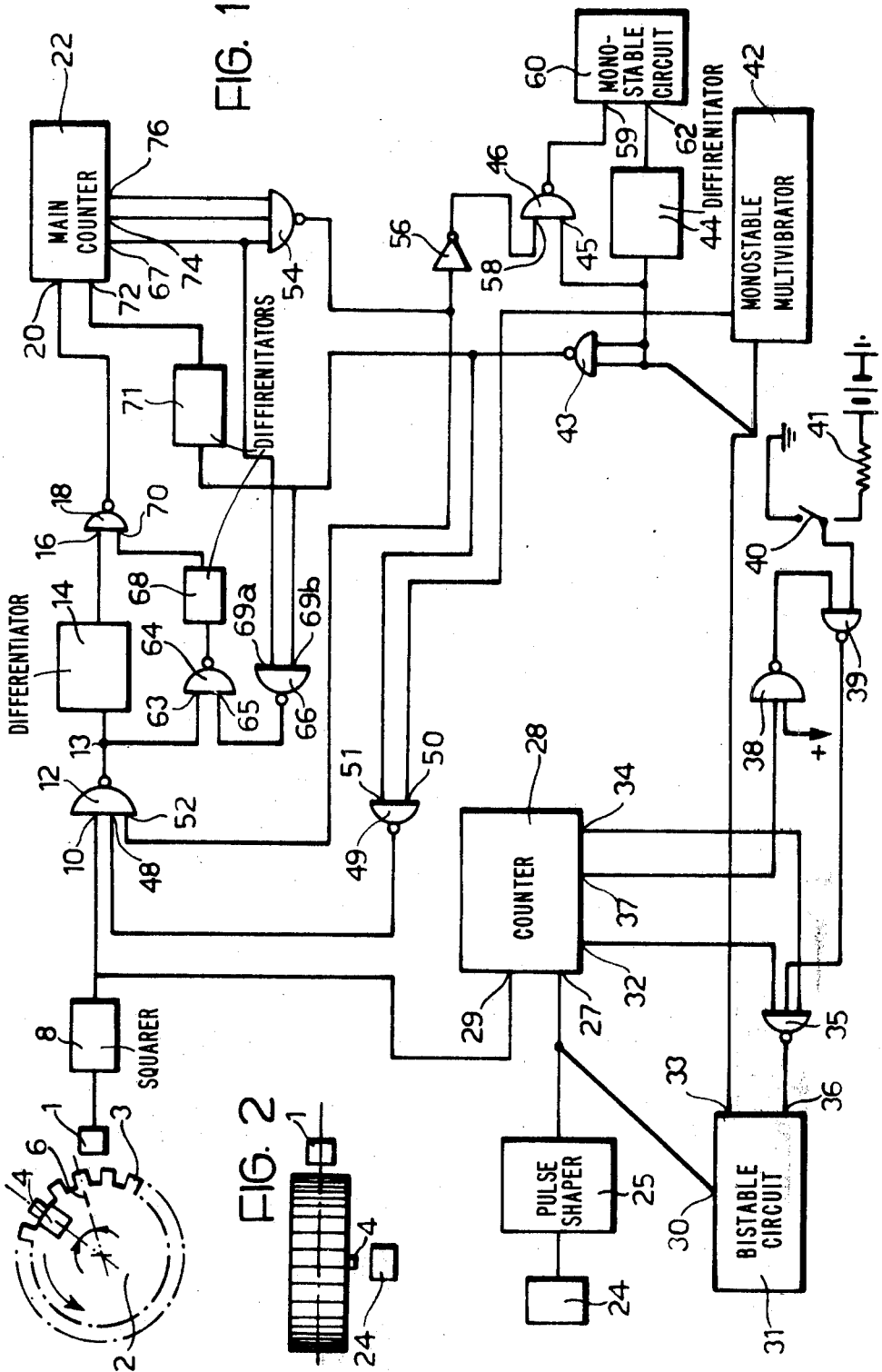
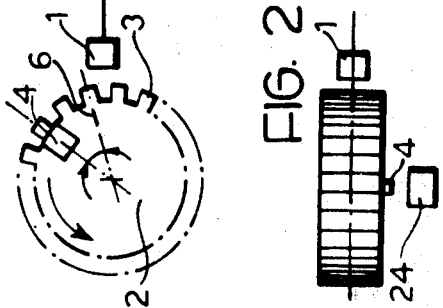

ELECTRONIC IGNITION SYSTEMS FOR AN INTERNAL COMBUSTION ENGINE

BACKGROUND OF THE INVENTION

The present invention relates to electronic ignition systems for internal combustion engines, and particularly to a device for the automatic variation of the spark advance in such an electronic ignition-system.

A number of different arrangements for varying the spark advance in electronic ignition systems for internal combustion engines are already known; this invention relates particularly to electronic systems for the automatic variation of the spark advance, which systems generally comprise an ignition spark discharge control circuit, and a circuit for varying the instant of discharge, which circuit is controlled by reference means located on a rotating element, generally the flywheel of the internal combustion engine.

Such reference means usually comprise a series of notches and corresponding teeth, of ferromagnetic material, spaced around the circumference of the flywheel or other rotating element in such a manner as to provide a detectable varying magnetic flux as the element rotates; a system for detecting the variation of the flux comprising, for example, one or more electromagnetic pick-ups, which cooperates with the ferromagnetic reference means on the rotating element so as to detect the speed of rotation and phase of the rotating element, and finally, electronic circuits responsive to the output signal from the pick-up for controlling the discharge of the ignition spark, operating to increase the spark advance as the speed of the engine increases.

Known ignition timing control systems are generally constructed in such a manner as to provide the spark at a minimum angular advance setting, in relation to the point of maximum compression of the charge in the cylinder, corresponding to a selected minimum speed of the engine, and the ignition advance increases linearly with the speed of the engine to reach a constant fixed value when the engine reaches a predetermined maximum speed.

The form of the ignition advance curve achieved by such known devices, however, only approximates to the actual curve required for the optimum functioning of the engine, which curve is usually of more complex form, and is different for different types of engine.

In order to approximate more closely the curves required in practice for certain types of engines, it is possible to use circuits which produce curves in which the part which varies linearly with the speed of the engine, is substituted by two straight lines of differing slope.

OBJECT OF THE INVENTION

The object of the present invention is to produce a device for controlling the ignition timing of an internal combustion engine, which is particularly simple, efficient and of low cost, but at the same time permits the production of a variable ignition advance having a curve including two straight lines for more closely approximating the required complex curve.

SUMMARY OF THE INVENTION

According to the present invention, there is provided a device for the automatic variation of the ignition spark advance angle in an electronic ignition system for an internal combustion engine, of the type comprising an ignition spark discharge control circuit, and a device for varying the instant of discharge of the ignition spark, wherein said device comprises: reference means located on a rotating member of the engine which turns with the crankshaft, said reference means comprising: at least one protuberance phase displaced in advance of a position on said rotating member representing the top dead centre position of said crankshaft of said engine by an angle $\theta m$ equal to the maximum spark advance angle required, said protuberance defining a reference position of said crankshaft, and a series of teeth on said rotating member, first pick-up means sensitive to the passage therepast of said teeth on said rotating member and responsive thereto to produce a train of pulses representing the speed of rotation of said rotating member; first counting means for counting said train of pulses from said first pick-up means during each ignition timing cycle of said engine, second pick-up means responsive to the passage therepast of said at least one protuberance to produce a pulse indicating said reference position of said crankshaft, means responsive to the output of said first counting means operating to initiate the ignition spark when said first counting means reach a predetermined count, first logic gating means connected to the output of said first pick-up means, the output from said first logic gating means being connected to the input of said first counting means, said first logic gating means selectively permitting the passage of pulses fed thereto to said first counting means, second counting means for counting the pulses produced by said first pick-up means from the moment when said protuberance passes said second pick-up means indicating that said crankshaft of said engine is at said reference position, timing circuit means operating to produce a timing signal output a predetermined time T after an input signal has been fed thereto, switching circuit means having a control input connected to the output from said second counting means, the output from said switching circuit means being connected to the input of said timing circuit, the output of said timing circuit being connected to a second input of said first logic gating means, frequency doubling means connected between said first logic gating means and said first counting means, said frequency doubling means operating to double the frequency of the pulses produced by said first pick-up means in the time interval between the instant when said crankshaft is in said reference position and the instant of discharge of the ignition spark, and if the speed of the engine is lower than a predetermined threshold $n_1$, also during said timing interval T or part thereof.

Further characteristics and advantages of the invention will become apparent from a consideration of the following description, provided by way of example only, with reference to the accompanying drawings.

BRIEF DESCRIPTION OF THE DRAWINGS

FIG. 1 is a diagram illustrating one embodiment of the invention;

FIG. 2 is a diagram of a detail of FIG. 1;

DESCRIPTION OF THE PREFERRED EMBODIMENT

Figure 3:
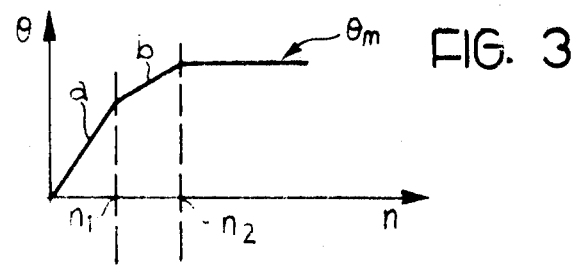
FIGS. 3 and 4 are diagrams illustrating the variation of the ignition advance angle $\theta$ in dependence on the number of revolutions per minute $n$ of the engine of two different embodiments.

In FIGS. 1 and 2 there is shown a rotating element 2 of an internal combustion engine which is not shown in detail. The rotating element may be, for example, a flywheel on whose periphery is located a ring gear 3, only a part of which is shown in the drawings, and which may be the usual starting ring gear to be found on the flywheels of most internal combustion engines of motor vehicles.

On the face of the flywheel 2 is a protuberance 4 which is displaced by an angle $\theta m$ in advance (with respect to the direction of rotation of the flywheel) of a reference mark 6 which indicates, with reference to another mark on the crankcase (not shown) when the flywheel is in the position corresponding to top dead centre of the crankshaft.

The angle $\theta m$ corresponds to the maximum ignition advance angle it is wished to achieve. Facing the rim of the flywheel 2 there is situated an electromagnetic pick-up 1 which produces electric pulses as the teeth move past, the pulse rate thus representing the speed of the engine. The electric pulses are passed to a squarer 8 connected to a first input 10 of a NAND gate 12 the output from which is fed to a differentiator 14 connected to a first input 16 of a NAND gate 18, the output from which is fed to a first input 20 of a main counter 22.

A further sensor 24 is positioned opposite the face of the flywheel 2 at a radial position corresponding to that of the aforementioned protuberance 4; the further sensor 24 produces one electrical pulse each time the protuberance 4 passes close to it.

The output signal from the further sensor 24 is fed to a pulse shaper 25 the output from which is connected to the reset input 27 of a counter 28, shown in FIG. 1 as a 3 bit counter and therefore with 3 outputs, the main input 29 of which is connected to the output of the squarer 8; the output of the pulse shaper 25 is also fed to the set input 30 of a bistable circuit 31.

Two of the outputs, indicated 32 and 34, of the counter 28 are fed to two inputs of a NAND gate 35 the output from which is taken to reset input 36 of the bistable circuit 31.

The third output, 37, of the counter 28 is fed to a first input of a NAND gate 38 the second input of which is always maintained at a positive value; the output of the NAND gate 38 is connected to a first input of a NAND gate 39 the second input of which is connected to a switch 40 which is selectively connectable through a resistance 41 to a voltage source, or to earth; the output of the gate 39 is fed to a third input of the NAND gate 35.

The three gates 35, 38 and 39 act as a coincidence circuit acting to input signals from the counter 28 to the bistable 31 only when they have predetermined logic levels which will be described in greater detail below.

The output of the bistable 31 is fed to the input of a monostable multivibrator 42 and also to the input of an inverter 43, the input of a differentiating circuit 44 and the first input 45 of a NAND gate 46.

The second input 48 of the NAND gate 12 is fed from the output of a NAND gate 49 having two inputs one of which, 50, is fed from the output of the monostable 12 and the other of which, 51, is fed with the output of the inverter 43. The gate 12 has three inputs the third, 52, of which is connected to the output of a NAND gate 54 and to the input of an inverter 56 connected to a second input 58 of the NAND gate 46.

The output of the NAND gate 46 is fed to a first input 59 of a monostable circuit 60 the second input 62 of which is fed from the output of the differentiating circuit 44. The output of the NAND gate 12 is also fed to a first input 63 of a NAND gate 64 the second input 65 of which is fed by the output of a NAND gate 66. The NAND gate 66 has two inputs 69b and 69a which are connected respectively to the output of the inverter 43 and to the output 67 of the main counter 22. The output of the gate 64 feeds a differentiating circuit 68 connected to a second input 70 of the NAND gate 18.

The output of the inverter 43 is also fed to a differentiating circuit 71 the output from which is fed to the reset input 72 of the main counter 22.

The main counter 22 which is also shown as a three bit counter, has three outputs 67, 74, 76 connected to three inputs of a NAND gate 54.

FIG. 3 illustrates the relation between the speed of the engine (expressed as number of revolutions per minute $n$) and the ignition spark advance angle achieved by the control device of the invention. In this diagram there is a first straight line section $a$ followed by a second straight line section $b$ having a slope half that of the section $a$, and finally a substantially horizontal section representing an unchanging spark advance angle when the engine is turning at a speed higher than a predetermined value $n_2$, the maximum spark advance angle then having the constant value $\theta m$.

The operation of the device will now be described with particular reference to FIGS. 5 to 13 and considering a a cycle between two successive passages of the protuberance 4 past the detector 24, assuming that the switch 40 is connected to earth.

FIGS. 5, 6, 7 and 8 represent, as a function of time $t$, the state V of the signals, respectively at the output of the pick-up 24, at the output of the bistable circuit 31, at the output of the monostable 42 and finally at the input 48 of the gate 12. FIGS. 9 to 13 represent, as a function of the time $t$, the state V of the signals at other characteristic points of the circuit as will be described below.

The pulses from the first sensor 1, produced by the passage of the teeth 3 of the flywheel 2 moving past this sensor are fed into the pulse shaper 8 and from there to the clock input 29 of the counter 28.

The pulse due to the passage of the protuberance 4 past the second sensor 24 is produced at an instant $t_o$ when the engine crankshaft is at an angle with respect to its top dead centre position corresponding to the maximum spark advance angle $\theta m$, and goes to the counter 28 setting it to zero cancelling the count accumulated in the preceding cycle and enabling it to count from zero for the new cycle; the same signal goes to the bistable 31 setting it, that is taking its output to the logic level 1.

The counter 28 is arranged so that, at a time $t_2$, when it has counted a number of teeth corresponding to the maximum spark advance angle $\theta m$ (which means that at least one piston of the engine has reached the top dead centre position) the three outputs of the counter 28 are at logic level 1 so that, if the switch 40 is connected to earth, the outputs of the gates 38 and 39 of the coincidence circuit are at logic level 0 and 1 respectively and thus the three inputs of the NAND gate 35 are at logic level 1 so its output is therefore at logic level 0. The reset input 36 of the bistable 31 is fed with the output of the NAND gate 35 and its output thus changes to logic level 0.

The switching of the bistable 31 occurs therefore at the instant when the crankshaft passes through the top dead centre position. In the meantime the ignition circuits of that part of the device situated downstream from this point cause, at the time $t_1$, as will be seen from the description below, the production of a spark with an advance angle as established by the device itself in the preceding cycle.

The trailing edge of the output signal from the bistable 31 switches the monostable 42 at the time $t_2$; the latter remains switched for a predetermined time T. The same signal from the bistable 31 is fed to the input of the inverter 43.

The monostable 42 has an output which is normally at logic level 1 and which is taken to level 0 when it is switched by the signal from the bistable 31 at the dead centre position of the crankshaft. The output signal from the monostable 42, together with the output signal from the bistable 31, inverted by the inverter 43, is fed to the inputs of the NAND gate 49 the output from which thus serves to permit or prevent the passage of pulses originating from the sensor 1 through the gate 12.

Figure 8:
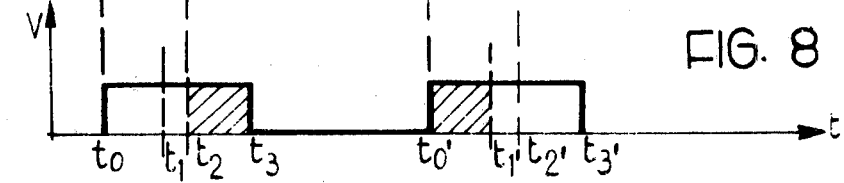

The output from the NAND gate 49 effectively controls the NAND gate 12 because, when pulses from the sensor 1 are present at the input 10 of the gate 12, since, as will be seen later, the input 50 of the gate 49 is kept at logic level 1 from one instant $t_3$ when the crankshaft passes through the top dead centre position until the instant $t_2'$ of the following ignition cycle, the said pulses can pass through the gate 12 during the time interval T during which the monostable is switched, and during the time interval between the instant $t_o'$ and the following switch instant $t_1'$, shown hatched in FIG. 8.

Figure 9:
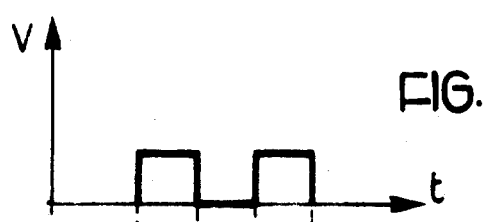
Figure 10:
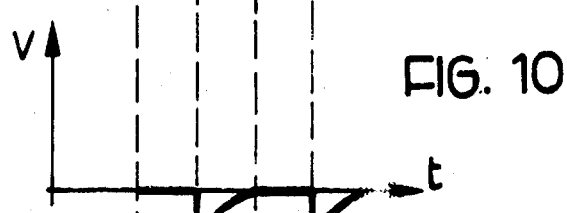

During these time intervals the pulses which pass through the gate 12, represented in FIG. 9, are differentiated at their trailing or negative-going edges by the differentiating circuit 14 so that the pulses at the input 16 of the gate 18 are in the form as shown in FIG. 10.

During the time interval $t_0 - t_1$, that is between the instant when the crankshaft passes through the maximum spark advance angle and the instant when the ignition spark is produced, the frequency of the pulses arriving at the input 20 of the main counter 22 is twice that of the pulses from the sensor 1. In fact during this interval the input 65 of the gate 64 is at logic level 1, therefore the pulses arriving at the input 63 of this gate pass, inverted, through it and the differentiating circuit 68 differentiates them in response to their negative-going or trailing edge. Consequently the output of the gate 18 is two series of pulses fed to the gate 18 from the two differentiators 14 and 58.

Figure 11:
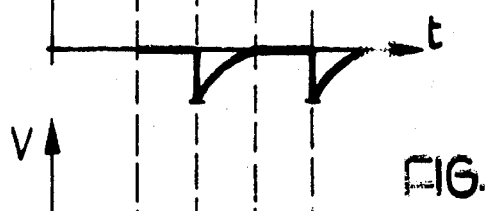
Figure 12:
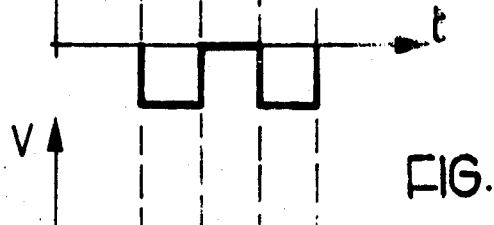
Figure 13:
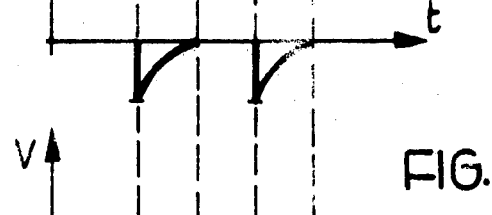

FIGS. 11 and 12 represent respectively the pulses at the output of the gate 64 and those at the output of the differentiating circuit 68, whilst FIG. 13 represents the pulses at the output of the gate 18.

During the switching interval T of the monostable 42 the number of pulses fed to the counter 22 is controlled by the speed of the engine. At the start of the switching interval of the monostable, the signal in the output line 67 of the counter is at logic level 0 and therefore the inputs 69a and 69b of the NAND gate 66 are respectively at logic level 0 and logic level 1, so that the output of this gate is at logic level 1. Pulses at the input 63 of the gate 64 are thus passed thereby as previously described and the counter 22 is fed with pulses at double the frequency of the sensor 1. When the counter has counted a number of pulses such that its output line 67 (and therefore the input 69a of the gate 66) switches to logic level 1, then since the two inputs of the gate 66, are not at level 1, the output of the gate 66 switches to logic level 0 and the passage of pulses through the differentiating circuit 68 is blocked so that the counter 22 is fed only with the train of pulses from the differentiator 14.

During the subsequent interval $t_o' - t_1'$ the counter 22 completes the count up to a predetermined number at which all its outpus are at logic level 1, and when this occurs, at the instant $t_1'$, it controls the ignition spark discharge in a manner which will be described below.

The output on line 67 of the counter 22 can only reach the logic level 1 during the time period T if the number of revolutions of the engine is above a certain value $nl$, whereas for speeds lower than this value the logic level 1 on the line 67 is never reached during the time interval T. In the first case the device controls a variation of the spark advance in accordance with part $b$ of the line shown in FIGS. 3 and 4, and in the second case to a variation according to part $a$ of the line shown in these Figures.

The control of the ignition spark discharge to occur at the time $t_1'$, that is on completion of the total count by the counter 22 when the inputs of the gate 54 are all at logic level 1, takes place as follows: when the inputs to the gate 54 are all at logic level 1 the output of this gate is a signal at logic level 0 which is fed both to the input 52 of the gate 12 and to the inverter 56. The gate 12 then blocks the passage of pulses from the sensor 1.

At the input 45 of the gate 46 there is already present a signal at logic level 1 so that when the input 58 of the gate is switched by the inverter 56 to the logic level 1, the gate 46 causes the switching of the spark discharge monostable 60. The signal at the output of this monostable circuit acts on the ignition control elements (not shown in the drawings) for example on a power transistor, which controls the discharge of the ignition coil. The monostable 60 has a switching time equal to the desired duration of the ignition spark.

By connecting the switch 40 directly to earth the output of the gate 39 always remains at logic level 1 and consequently the gate 35 produces the coincidence signal at a lower count at the output of the counter 28 than it would with the switch connected to the resistor 41, in which case the output of the gate 39 could commute between levels 1 and 0 depending on the logic level of the output 37 of the counter 28 since the input to the gate 39 via the switch 40 is effectively held at logic level 1.

Figure 4:
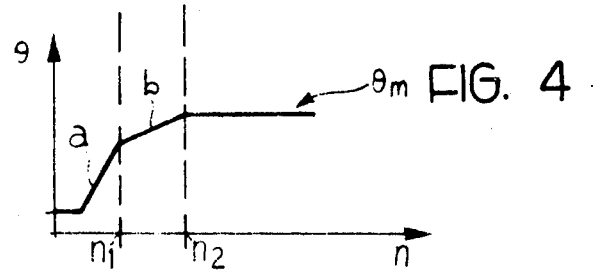
Figure 5:
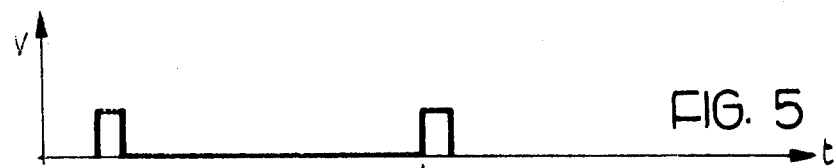
FIGS. 5 to 13 represent wave forms of the signals formed at various points of the circuits of the embodiment.
Figure 6:
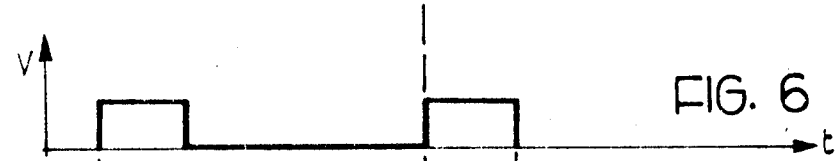
Figure 7:
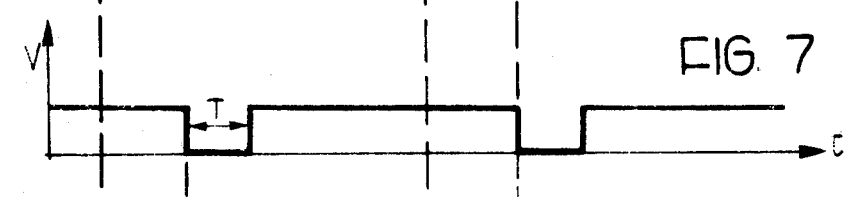

In this manner a fictitious top dead centre position is created in advance by a predetermined angle with respect to the position of the real top dead centre. This ensures that the ignition spark advance angle is maintained at a certain minimum value when the engine is turning at low speed, as shown in FIG. 4, rather than falling to a zero advance angle as would be the case with the switch 40 held in the position shown in FIG. 1, as illustrated in FIG. 3.

We claim:

1. A device for automatic variation of the ignition spark advance angle in an electronic ignition system for an internal combustion engine, of the type comprising an ignition spark discharge control circuit, and a device for varying the instant of discharge of the ignition spark, wherein said device comprises:

reference means located on a rotating member of the engine which turns with the crankshaft, said reference means comprising:
- at least one protuberance phase displaced in advance of a position on said rotating member representing the top dead centre position of said crankshaft of said engine by an angle $\theta m$ equal to the maximum spark advance angle required, said protuberance defining a reference position of said crankshaft, and
- a series of teeth on said rotating member, first pick-up means sensitive to the passage therepast of said teeth on said rotating member and responsive thereto to produce a train of pulses representing the speed of rotation of said rotating member;

first counting means for counting said train of pulses from said first pick-up means during each ignition timing cycle of said engine, second pick-up means responsive to the passage therepast of said at least one protuberance to produce a pulse indicating said reference position of said crankshaft, means responsive to the output of said first counting means operating to initiate the ignition spark when said first counting means reach a predetermined count, first logic gating means connected to the output of said first pick-up means, means connecting the output from said first logic gating means to the input of said first counting means, said first logic gating means selectively permitting the passage of pulses fed thereto to said first counting means, second counting means for counting the pulses produced by said first pick-up means from the moment when said protuberance passes said second pick-up means indicating that said crankshaft of said engine is at said reference position, timing circuit means operating to produce a timing signal output a predetermined time T after an input signal has been fed thereto, logic switching circuit means having a control input connected to the output from said second counting means, the output from said switching circuit means being connected to the input of said timing circuit, means connecting the output of said timing circuit, to a second input of said first logic gating means, frequency doubling means connected between said first logic gating means and said first counting means, said frequency doubling means operating to double the frequency of the pulses produced by said first pick-up means in the time interval between the instant when said crankshaft is in said reference position and the instant of discharge of the ignition spark, and if the speed of the engine is lower than a predetermined threshold $n_1$, also during said timing interval T or part thereof.

2. The device of claim 1, wherein said frequency doubling means comprises:
- second logic gating means having two inputs one of which is connected via an inverter to the output of said logic switching circuit and the other of which is connected to one output of said first counting means,
- third logic gating means having two inputs, one connected to the output from said first logic gating means and the other connected to the output of said second logic gating means,
- first differentiating means, the input of which is connected to the output of said third logic gating means,
- second differentiating means the input to which is connected to the output of said first logic gating means, and
- fourth logic gating means having two inputs, one connected to the output of said first differentiating means and the other connected to the output of said second differentiating means, said fourth logic gating means acting to pass output pulses produced at the outputs of both said first and said second differentiating means.

3. The device of claim 1, wherein there is a coincidence circuit between said plural outputs of said second counting means and said control input of said logic switching circuit.

4. The device of claim 1, wherein there are provided means for resetting said first counting means said resetting means being connected between the output of said logic switching circuit and the reset input of said first counting means and acting to reset said first counting means when said logic switching means are switched upon the reception of a pulse from said second pick-up means indicating that the crankshaft of the engine is in said reference position.

* * * * *